United States Patent [19]
Fuhrmann et al.

[11] 3,732,303
[45] May 8, 1973

[54] PROCESS FOR THE PREPARATION OF 2-OXIMINO-6-NITRO HEXANAMIDE

[75] Inventors: Robert Fuhrmann, Morris Plains; Fred W. Koff, Clifton; John Pisanchyn, Morristown, all of N.J.

[73] Assignee: Allied Chemical Corporation, New York, N.Y.

[22] Filed: Oct. 14, 1971

[21] Appl. No.: 189,365

[52] U.S. Cl. ............................................. 260/561 A
[51] Int. Cl. .............................................. C07c 103/00
[58] Field of Search ................................... 260/561 A

[56] References Cited

FOREIGN PATENTS OR APPLICATIONS 1,203,540  8/1970  Great Britain.......................260/561
1,226,893  3/1971  Great Britain.......................260/561

Primary Examiner—Lewis Gotts
Assistant Examiner—Ethel G. Love
Attorney—Arthur J. Plantamura et al.

[57] ABSTRACT

2-oximino-6-nitro hexanamide is suitably purified by recrystallization from a solvent selected from the group consisting of (a) $C_1$ to $C_3$ dialkyl ethers of ethylene glycol, and (b) $C_2$ to $C_5$ halogenated alkanes having a Cl/C atom ratio ranging from about 1:1 to 1:3.

2 Claims, No Drawings

PROCESS FOR THE PREPARATION OF 2-OXIMINO-6-NITRO HEXANAMIDE

CROSS-REFERENCE TO RELATED APPLICATIONS

This application is related to copending, commonly assigned applications Ser. No. 097,290 filed Dec. 11, 1970, and Ser. Nos. 852,947 now U.S. Pat. No. 3,681,460, and 852,881, now abandoned, both filed August 25, 1969.

BACKGROUND OF THE INVENTION

This invention relates to a process for the purification of 2-oximino-6-nitro hexanamide. This compound is a precursor of both lysine and lysine amide, both nutritionally highly-valuable compounds.

U.S. Pat. No. 3,256,095 discusses in some detail the nutritional utility of a variety of amino acids and their amides, including inter alia lysine. Co-pending application Ser. No. 097,290 describes a process for the preparation of lysine and lysine amide as follows:

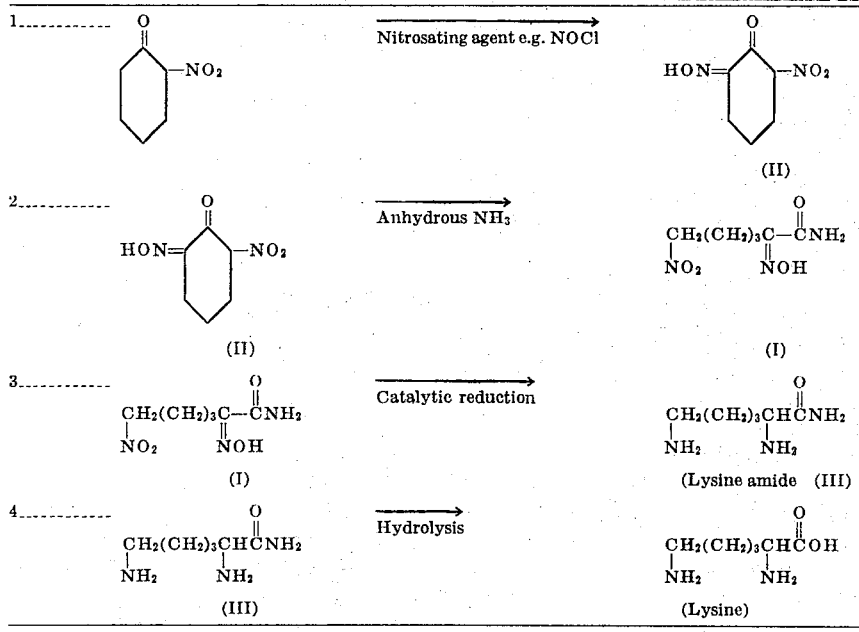

German Offenlegunsschrift Pat. No. 1,926,857 also teaches the preparation of compound III above by a similar route. Purification of said compound I by recrystallization from water is also taught therein. We have, however, found that recrystallization of compound I from water or other conventional recrystallization solvents possesses numerous disadvantages not encountered when recrystallization is effected from certain specific solvents utilized in accordance with the instant invention.

SUMMARY OF THE INVENTION

It has now been found in accordance with the instant invention that recrystallization of 2-oximino-6-nitro hexanamide (compound I) from a solvent selected from the group consisting of $C_1$ to $C_3$ dialkyl ethers of ethylene glycol and $C_2$ to $C_5$ halogenated alkanes having a Cl/C atom ratio ranging from about 1:1 to about 1:3 is superior to other known methods of purification.

Purification of compound I by some method is essential prior to the catalytic reduction thereof to afford compound III to avoid poisoning of the catalyst and also formation of side products which are extremely difficult to remove from compound III. Needless to say, any compound intended for ingestion by humans or animals must be scrupulously free of contaminating side products.

It should be noted that purification of compound I by methods other than recrystallization is either not economically feasible or inoperable. Compound I, for example, is not sufficiently thermally stable to withstand distillation or sublimation. As heretofore indicated, the prior art teaches the purification of compound I by recrystallization from water. We have found that water possesses serious shortcomings as a recrystallization solvent. Specifically, we have found that the subsequent catalytic reduction of compound I to afford compound III must be carried out under scrupulously anhydrous conditions to avoid a substantial loss in product yield through cleavage of the C=NOH group. If compound I is recrystallized from water, a small amount thereof will invariably be occluded in the recovered crystals. This occluded water must be removed by thorough drying, usually at reduced pressure, if the aforementioned loss of product on hydrogenation is to be avoided. In contradistinction, the solvents of the instant invention are not significantly occluded by the crystals and additionally, any that is occluded has no significant adverse effect on the subsequent hydrogenation.

Most other non-aqueous recrystallization solvents are ineffective for either or both of the two following reasons:

1. The recovered crystals still contain a significant amount of side products and contaminants, i.e., the side product and/or contaminants do not remain dissolved in the recrystallization solvent mother liquor.

2. The recovery of purified product from the solvent is unduly low. At least about 90 percent of the compound I dissolved in the solvent should be recovered as pure crystals to avoid excessive loss of product yield. Only the solvents enumerated herein have been found to be free from both of the above-enumerated shortcomings.

Most commonly utilized organic or inorganic solvents suffer from an even more fundamental defect which precludes their use with compound I. That is, compound I is either substantially totally insoluble therein or substantially fully soluble even in chilled solvent. In either of these instances, of course, recrystallization is impossible.

What this invention comprises therefore is the purification of 2-oximino-6-nitro hexanamide by recrystallization from a solvent selected from the group consisting of $C_1$ to $C_3$ dialkyl ethers of ethylene glycol and $C_2$ to $C_5$ halogenated alkanes having a Cl/C atom ratio ranging from about 1:1 to about 1:3.

The actual recrystallization procedure utilized is conventional in the art. That is, one part of crude recovered compound I is dissolved in from about 1 to 50 or more parts by weight of solvent, preferably with agitation and heating. The solution is then cooled to a temperature ranging from slightly above room temperature, down to about 0°C., and let stand until crystals of the pure compound I form. If desired, crystallization can be encouraged by seeding. These crystals are then recovered by filtration, decantation or other known methods. Preferably, dissolution is effected in about 5 to 30 parts by weight of solvent heated at or almost at reflux, followed by slow cooling to about 0°C. to effect crystallization. The exact amount of solvent chosen and temperature of heating for solution and of cooling for crystallization can, of course, be readily determined by routine experimentation. The solvents of the instant invention are uniquely superior in that a very high recovery (>90 percent) of the desired product is obtained while essentially all of the contaminants remain dissolved in the solvent. All other solvents tried from which recrystallization was even possible gave either significantly lower recovery of crystals or the crystals contained occluded impurities, or both.

Illustrative of the solvents of the instant invention are glyme (ethylene glycol dimethyl ether), 1-methoxy-2-ethoxy ethane, ethylene glycol diethylether, 1,2-di-n-propoxy ethane, 1,2-dichloroethane, 2,2-dichloroethane, 2,3-dichloropropane, 1,3-dichloropropane, 1,4-dichlorobutane, 2,2,3-trichlorobutane and 1,2,3,4,5-pentachloropentane. Mixtures of any of the solvents of the instant invention can be utilized for recrystallization, but provide no significant advantage over the use of a single solvent.

EXAMPLE 200 parts of α-nitrocyclohexanone was reacted with nitrosyl chloride using $SO_2$ as a reaction solvent to afford 2-nitro-6-oximinocyclohexanone. The reaction mixture was stripped and the residue (195 parts) dissolved in anhydrous ammonia (200 parts) containing 400 parts of anhydrous methanol in a glass-lined pressure vessel which was then sealed and shaken for one hour at 80° C. The vessel was then cooled to ambient temperature, vented and the ammonia and methanol stripped off. The residue of crude product (200 parts) was used to supply aliquots for testing various recrystallization solvents. In each case, 5 parts of crude product were dissolved in 40 parts of solvent heated to the boiling point. The solution was then allowed to cool slowly to ambient temperature. If no crystals formed after 12 hours standing at ambient temperature, the solution was cooled to 0° for 24 hours. If still no crystal formation occurred, then the solution was evaporated down to a total weight of 20 parts and cooled again, first to ambient temperature and then to 0°C. as before. In no case where no crystallization occurred with 40 parts of solvent did further reduction in volume afford crystals. Results are tabulated below.

| Solvent | Recrystallized Product Yield, % | Recrystallized Product Melting Point, °C |
|---|---|---|
| glyme | 90 | 96.5 – 97.5 |
| 1-methoxy-2-ethoxy-ethane | 92 | 97 – 97.5 |
| ethylene glycol diethylether (diglyme) | 90 | 96.5 – 97.5 |
| 1,2-di-n-propoxy ethane | 93 | 96 – 97 |
| 1,2-dichloroethane | 91 | 98 |
| 2,2-dichloroethane | 94 | 97 – 97.5 |
| 1,3-dichloropropane | 90 | 96 – 97 |
| 1,2-dichloropropane | 97 | 96 – 97 |
| 1,4-dichlorobutane | 93 | 96 – 97 |
| 1,2,3,4,5-pentachloro pentane | 92 | 96 – 97 |
| methanol | 0 | |
| ethanol | 0 | |
| $CCl_4$ (insoluble) | 0 | |
| $CHCl_3$ (insoluble) | 0 | |
| acetone | 0 | |
| benzene | 50 | 90 – 95 |
| toluene | 60 | 90 – 95 |
| water | 0 | |
| 50/50 water ethanol | 65 | 91 – 95 |
| methyl ethyl ketone | 0 | |
| acetonitrile | 0 | |
| isopropanol | 0 | |
| nitromethane | 0 | |
| nitroethane | 0 | |
| dioxane | 0 | |
| tetrahydrofuran | 0 | |
| butyl acetate | 0 | |

The recrystallized product (2-oximino-6-nitrohexanamide) has a melting point of about 97.5°C. and in all cases, the structure of isolated product was checked by I.R. and NMR spectrographic analysis. The product was found to be essentially insoluble in carbon tetrachloride, chloroform, methylene chloride, isooctane, cyclohexane and diisopropyl ether.

We claim:

1. In a process comprising nitrosating 2-nitrocyclohexanone to afford 2-nitro-6-oximinocyclohexanone, ammoniating said 2-nitro-6-oximinocyclohexanone to afford 2-oximino-6-nitrohexanamide and then reducing said 2-oximino-6-nitro-hexanamide to afford lysine amide, the improvement comprising purifying said 2-oximino-6-nitrohexanamide prior to said reduction by recrystallization from a solvent selected from the group consisting of $C_1$ to $C_3$ dialkyl ethers of ethylene glycol and $C_2$ to $C_5$ halogenated alkanes having a Cl to C atom ratio ranging from about 1:1 to about 1:3.

2. A process in accordance with claim 1 wherein said 2-oximino-6-nitrohexanamide is recrystallized from 5 to 30 parts by weight of said solvent.

* * * * *